C. L' HOMMEDIEU.
CLOTHES-LINE REEL.

No. 169,453. Patented Nov. 2, 1875.

UNITED STATES PATENT OFFICE.

CHARLES L'HOMMEDIEU, OF MIDDLETOWN, NEW YORK.

IMPROVEMENT IN CLOTHES-LINE REELS.

Specification forming part of Letters Patent No. 169,453, dated November 2, 1875; application filed June 26, 1875.

*To all whom it may concern:*

Figure 1:
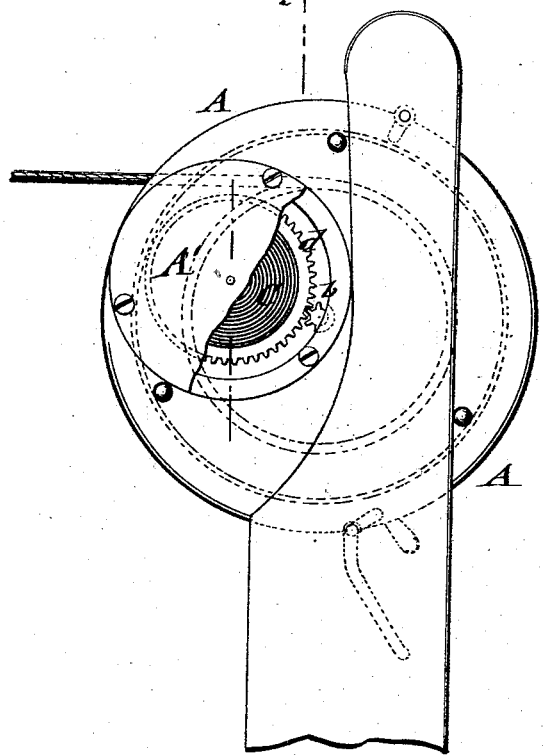
Figure 2:
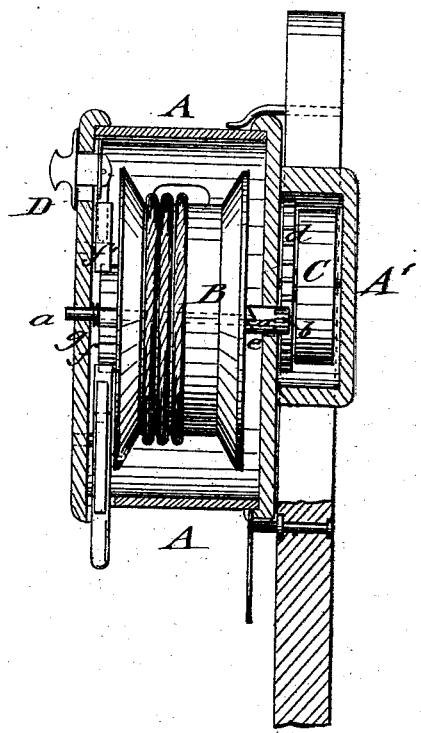
Figure 3:
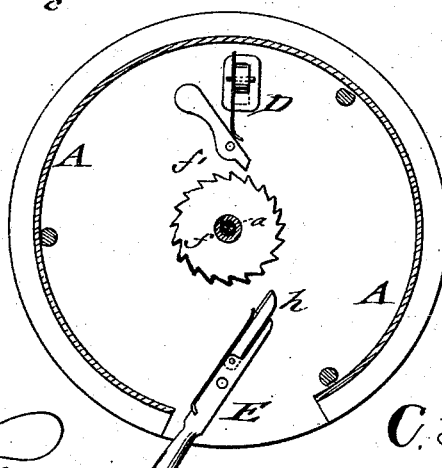

Be it known that I, CHARLES L'HOMMEDIEU, of Middletown, in the county of Orange and State of New York, have invented a new and Improved Clothes-Line Reel, of which the following is a specification:

In the accompanying drawing, Figure 1 represents a side view of my improved clothes-line reel partly cut open. Fig. 2 is a vertical transverse section on line c c, Fig. 1, and Fig. 3 a vertical longitudinal section of the same, showing check-pawl and tension-regulating device.

Similar letters of reference indicate corresponding parts.

My invention relates to an improved clothes-line reel which winds up the line automatically as soon as the same is released from the post, protects the same, when applied stationary to the post, against the weather, and allows the ready taking down, the whole forming a labor-saving device for household purposes.

The invention will first be described in connection with drawing and then pointed out in claims.

In the drawing, A represents a cylindrical casing of suitable size, according to the length and thickness of the clothes-line. Casing A incloses entirely the pulley or drum B, which revolves freely on a central spindle, $a$, and serves to wind up the clothes-line thereon. A pinion, $b$, at the end of spindle $b'$, gears with a cog-wheel, $d$, to whose shaft a strong coiled spring, C, is applied, which is also entirely encased by a supplementary casing, A', attached to the side of the main casing. The interior parts of the reel are thus completely protected against the influence of the weather when the same is attached stationary to a post, while the whole may also be readily taken down by using suitable fastenings, as shown in Figs. 1 and 2, forming thereby a very handy and conveniently carried device. The spindle $a$ is connected with the loose drum B by a clutch mechanism, $e$, near the pinion, which allows the turning of the drum in one direction for unwinding the line, but throws the drum, on the release of the line, in connection with the coiled spring, and produces by the same the turning of the drum in opposite direction, so as to wind up the line. As soon as, therefore, the end of the line is released from the post to which it has been attached, it is automatically and quickly wound up by the reel. A ratchet-wheel, $f$, attached to the drum, serves to lock the same against the action of the spring when the required length of line is drawn out, by being engaged by a check-pawl, $f'$, operated by a spring-slide mechanism, D. On releasing the slide, the spring acts instantly on the drum and rewinds the line. A spiral spring, $g$, is placed between drum and casing, to secure the reliable working of the clutch mechanism. A fulcrumed lever, E, with pivoted spring-pawl $h$, for engaging the ratchet-teeth of the drum in one direction, but clearing the same in opposite direction, projects through a slot of the casing A to the outside of the same, and serves to impart to the drum-revolving spring the required tension, by means of the clutch and intermediate gearing. The slack of the coiled spring, after repeated use of the reel, may thereby be readily taken up and the full spring action of the reel restored.

Having thus described my invention, I claim as new and desire to secure by Letters Patent—

1. The combination of the slide mechanism and check-pawl, with the fast ratchet of the spring-acted drum, for checking action of spring at any length of line drawn out, substantially as specified.

2. The combination of the drum, having fast ratchet-wheel, and of the operating clutch and spring mechanism, with a fulcrumed lever, having a pivoted spring-pawl, for readjusting tension of main spring, substantially as shown and described.

CHARLES L'HOMMEDIEU.

Witnesses:
FRED. N. FRIEND,
CHAS. J. BOYDE.